March 31, 1970　　G. H. HEILMEIER ET AL　　3,503,673
REDUCTION OF TURN-ON DELAY IN LIQUID CRYSTAL CELL
Filed Sept. 14, 1967　　3 Sheets-Sheet 1

INVENTORS  
George H. Heilmeier &  
Louis A. Zanoni  
BY Samuel Cohen  
ATTORNEY INVENTORS
George H. Heilmeier &
Louis A. Zanoni
BY
ATTORNEY March 31, 1970  G. H. HEILMEIER ET AL  3,503,673
REDUCTION OF TURN-ON DELAY IN LIQUID CRYSTAL CELL
Filed Sept. 14, 1967                      3 Sheets-Sheet 3

INVENTORS
George H. Heilmeier &
Louis A. Zanoni
BY *James Cohen*
ATTORNEY

United States Patent Office 3,503,673
Patented Mar. 31, 1970

3,503,673
REDUCTION OF TURN-ON DELAY IN LIQUID CRYSTAL CELL
George H. Heilmeier, Philadelphia, Pa., and Louis A. Zanoni, Mercerville, N.J., assignors to RCA Corporation, a corporation of Delaware
Filed Sept. 14, 1967, Ser. No. 667,857
Int. Cl. G02f 1/28
U.S. Cl. 350—160     6 Claims

ABSTRACT OF THE DISCLOSURE

The application to a liquid crystal cell of an electrical bias at a voltage level lower than the voltage threshold for dynamic scattering increases the effective internal resistance of the cell and substantially decreases the response time of the cell.

BACKGROUND OF THE INVENTION

Nematic liquid crystals are described in copending application "Electro-Optical Device," Ser. No. 627,515, filed Mar. 31, 1967, by the present joint applicants and assigned to the same assignee as the present application. Such crystals, when in an unexcited state, are relatively transparent to light and, when in an excited state, scatter light. In the crystals described in the application, the light scattering, termed "dynamic scattering," results from turbulence developed in the liquid crystal at the region at which it is excited as is discussed briefly later.

The dynamic scattering exhibited by liquid crystals may be employed in reflective, absorptive and transmissive type flat panel displays, in light shutters and in other applications. However, it is found, in practice, that in those applications for the nematic liquid crystals where it is necessary to turn them on (to change them from their transparent state to their light scattering state) by the successive application of pulses of relatively short duration, such as video pulses, it may take a number of such pulses to cause the liquid crystal to "light up" at full intensity. This, of course, is a disadvantage and, in television applications, results in "leading edge smear."

The object of this invention is to provide a means for quickly turning on a liquid crystal element, that is, for quickly changing such an element from its transparent to its light scattering condition, and at the same time for increasing the brightness of the element, that is, for increasing the amount of light scattering it produces.

SUMMARY OF THE INVENTION

A nematic liquid crystal element is rapidly turned on according to the invention by sweeping the current carriers out of the crystal and in this way maintaining its effective internal resistance high prior to the application of turn-on excitation pulses to the crystal.

DETAILED DESCRIPTION

Figure 1:
FIGURE 1 is a schematic showing of a nematic liquid crystal in its unexcited state.

In a nematic liquid crystal of the type discussed in detail in the copending application, liquid crystal molecules are arranged in the manner shown in FIG. 1 for a temperature range of interest in the use of this substance in display applications. As contrasted to ordinary liquids wherein the molecules assume random orientations, small groups of the molecules are in alignment with one another. These groups may be termed domains. The orientation of the domains relative to one another is random and in view of the fact that the number of molecules in each domain is relatively small, the liquid crystal appears to be relatively transparent.

Figure 2:
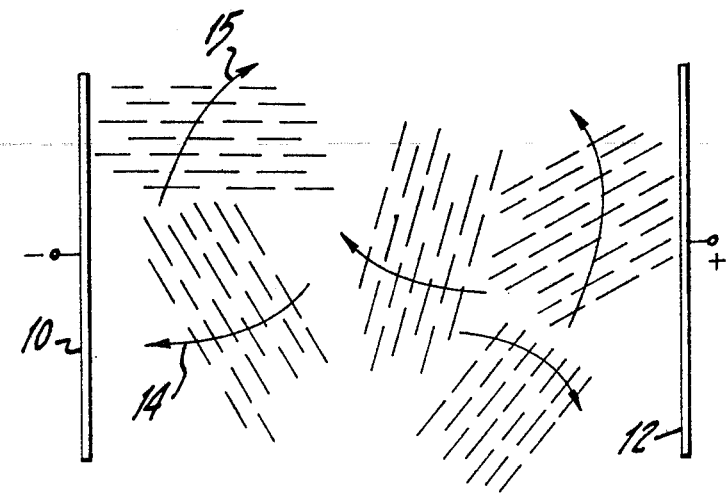
FIGURE 2 is a schematic showing of a nematic liquid crystal in its excited state.

In the use of a nematic liquid crystal in display and other applications, the crystal is located between two conducting elements, shown schematically at 10 and 12 in FIG. 2, and a current is injected into the liquid crystal at a field greater than the dynamic scattering threshold electric field of the crystal. The electric field causes a number of the domains of FIG. 1 to become aligned so that each domain becomes relatively large. The ionic current injected into the liquid crystal causes negative ions to flow from the negatively charged conductor 10 to the positively charged conductor 12. It is believed that during such movement, and possibly during the movement of other ions which may be present in the liquid, the ions collide with or in some other way, disturb the relatively large domains causing them continually to move. This movement is indicated schematically in FIG. 2 by arrows such as 14 and 15. The effect on the eye of such movement is that of scattering light which is incident on the liquid crystal. Contrast ratios due to such scattering of greater than 10 to 1 have been observed. In other words, the brightness of the thin film of liquid crystal in the presence of incident light (this is normally unpolarized light) may be more than 10 times greater during the time the domains are in a turbulent state as shown in FIG. 2 than during the time the liquid crystal is in an unexcited state as shown in FIG. 1.

In practice, a liquid crystal display includes two planar elements with a thin liquid film between them. One of the elements may be transparent and the other reflective. Row and column conductors, which may be transparent conductors, may be in contact with the liquid crystal for exciting selected areas of the liquid crystal. All of this is discussed and shown in the copending application.

Figure 3:
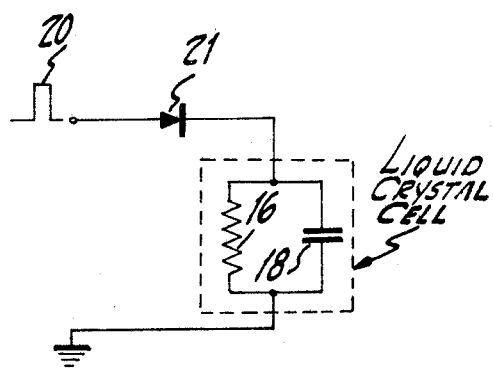
FIGURE 3 is a schematic drawing of a known nematic liquid crystal excitation circuit in which the liquid crystal is shown in equivalent circuit form.

A simplified equivalent circuit for a liquid crystal is a resistor such as shown at 16 in FIG. 3, in shunt with a capacitor, such as shown at 18. The crystal is excited by applying a short duration pulse such as 20 to the crystal. In television applications, this pulse may have a duration of 0.06 millisecond which is the equivalent of one television line time. This implies that an entire line of information is written into a display at a time. Operation in this way, that is, a line at a time rather than an individual element of a line at a time is preferred because it permits a greater length of time for capacitor 18 of the liquid crystal cell to charge. It is also important that the capacitor 18 retain its charge for a reasonable time interval to permit the dynamic scattering to take place. The function of diode 21 is to permit such storage. It prevents discharge of the capacitor through the source (not shown) which produces pulse 20 so that the capacitor must discharge through the liquid crystal itself as represented by the resistor 16.

Figure 4:
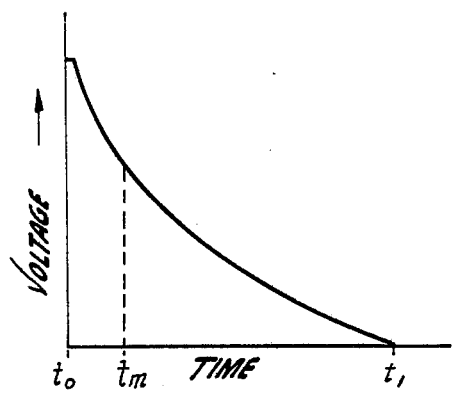
FIGURE 4 is a drawing of the voltage which exists across the liquid crystal of the circuit of FIG. 3, after a number of excitation pulses have been applied thereto.

The actual voltage present across the liquid crystal cell after a number of such excitation pulses, is as shown in FIG. 4. At time $t_o$, the pulse 20 is applied. This charges the capacitor and the latter subsequently discharges exponentially, in the manner shown, until at time $t_1$ the capacitor has completely discharged.

Figure 5:
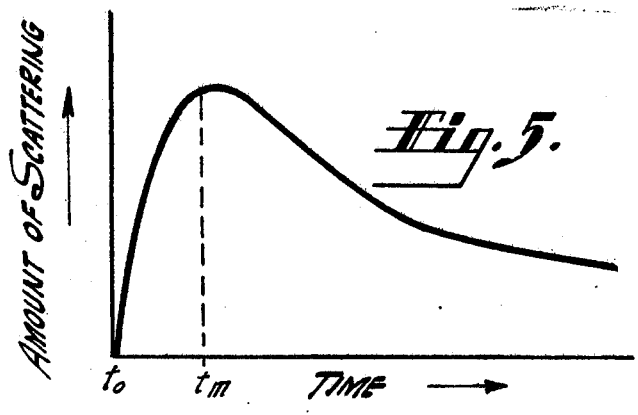
FIGURE 5 is a graph showing the amount of light scattering which occurs in the liquid crystal of the circuit of FIG. 3.

The amount of light scattering which occurs in the liquid crystal cell of FIG. 3 is as shown in FIG. 5. It takes a short interval of time $t_o$ to $t_m$, approximately 1–10 milliseconds (depending upon the temperature, field strength and particular material used) for the maximum amount of light scattering to be achieved. At time $t_1$, when there is no longer any voltage across the liquid crystal cell, there is still a considerable amount of scattering present, as the mechanical time constant, that is, the time it takes for the domains of FIG. 2 to relax from their excited condition to their unexcited condition shown in FIG. 1, is relatively long.

Figure 6:
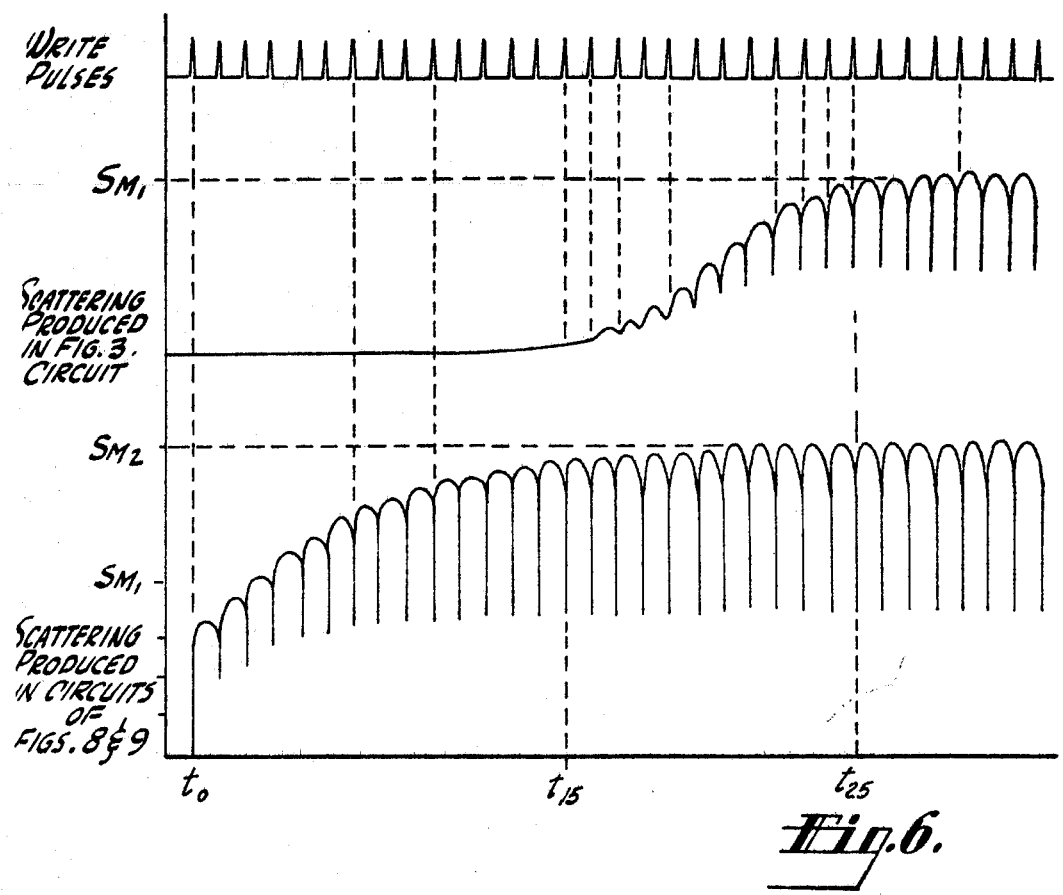
FIGURE 6 is a drawing of waveforms which shows in greater detail the light scattering which occurs in the circuit of FIG. 3 and also in the improved circuits of the present application shown in FIGS. 8 and 9.

In the actual operation of the circuit of FIG. 3, it is found that if the liquid crystal cell is dark initially, it requires a relatively large number of excitation pulses 20 to be applied before the crystal exhibits the light scattering characteristic shown in FIG. 5. This is shown in the top two waveforms of FIG. 6. The excitation pulses, termed "write" pulses in FIG. 6, are shown on the upper line. While these pulses are shown to be of fixed amplitude greater than the dynamic scattering threshold of the crystal, in television applications they would be video pulses and their amplitudes would correspond to the video information it is desired to write into a particular element during successive excitations of that element. These write pulses are each of a duration of approximately 0.06 millisecond and are at a repetition frequency of approximately 30 pulses per second.

It may be observed in the second waveform of FIG. 2 that for one particular sample approximately 15 write pulses are required to start the dynamic scattering effect. The scattering effect does not reach full amplitude until more than 20 write pulses have been applied. (Note that these are examples only. The turn-on delay depends on such parameters as temperature, material, cell dimensions, and so on and may be more than or less than the time given.) It may also be observed that the waveform is displaced from the zero scattering axis, indicating that there is insufficient time between successive write pulses for the amount of light scattering to reduce to zero. The reason is that mentioned briefly above, namely that the relaxation time constant associated with the turbulence created in the liquid crystal is relatively long. A solution to this problem is given in concurrently filed application, "Turn-Off Method and Circuit for Liquid Crystal Display Element," Ser. No. 667,858, filed Sept. 14, 1967, by George H. Heilmeier and assigned to the assignee of the present application. The circuit of this copending application may be added to the present circuit; however, as it plays no part in the present invention, it is not shown or discussed further herein.

The inventors believe that the reason it requires so long for a liquid crystal element to turn on is that the resistor 16 is, in fact, non-linear. Initially, that is, in response to the first excitation pulse, this resistor exhibits a relatively low resistance value so that the capacitor 18 discharges relatively rapidly as illustrated by the solid line curve 30 of FIG. 7. At the time $t_m$, which is the time required for the amount of scattering produced in the crystal to reach its maximum value, the voltage $V_A$ across the cell is extremely low—lower than the dynamic scattering voltage threshold of the cell. Accordingly, no scattering is produced and this is borne out in the second curve of FIG. 6.

The relatively low resistance above has been found to be much smaller than the final resistance achieved by the cell. While the reason for this is not completely understood, the present inventors believe that initially there are current carriers present in the liquid crystal. These may be free ions or impurities which act as conducting particles or perhaps other current carriers, the nature of which is not fully understood. It is believed that when the crystal is excited initially, that is, when the pulses are initially applied across the crystal, they cause these current carriers (negative and positive) to travel through the liquid crystal to the positive and negative conductors, respectively, corresponding to 12 and 10 of FIG. 2. This movement of current carriers through the liquid crystals corresponds to relatively low resistivity of the crystal. (The term relatively low, in the present context, may refer to a resistivity of the order of $10^9$ ohm centimeters compared to a high resistivity condition of the cell of $10^{10}$ ohm centimeters. These numbers are merely examples since cells of other dimensions, cells made of other materials, and cells with other different parameters may have other low and high resistivity values.)

Figure 7:
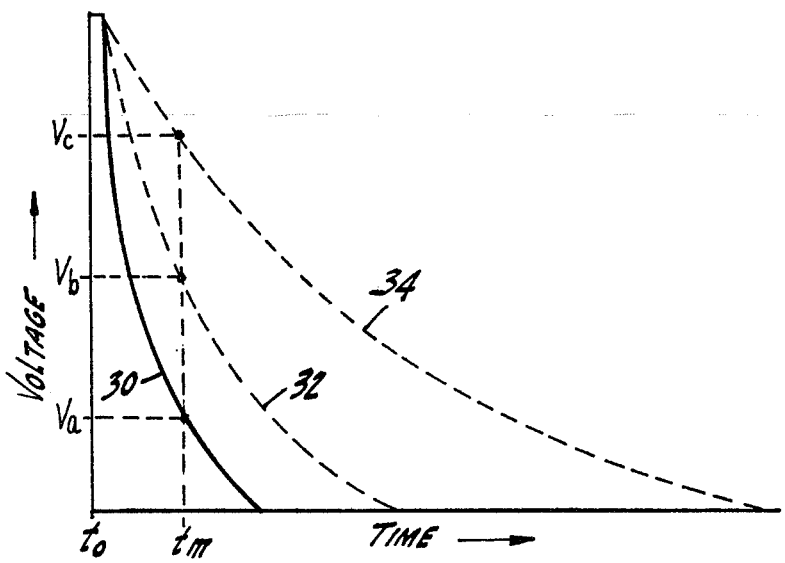
FIGURE 7 is a graph showing the voltage across the liquid crystal cell of FIG. 3 at different periods during the operation of this cell.

As successive pulses continue to be applied to the liquid crystal, the free current carriers gradually are swept out of the liquid and reach the positive and negative conductors (10 and 12 of FIG. 2). During this period, the internal resistance, represented by resistor 16 of FIG. 3, gradually increases. As the value of the resistance increases, the liquid crystal cell discharge time constant increases correspondingly, and the shape of the exponential discharge curve also changes, as shown in FIG. 7. Here, curve 30 may represent the voltage across one particular liquid crystal cell in response to 1 pulse, the curve 32 the voltage in response to perhaps 10–15 successive pulses and the curve 34 the voltage in response to perhaps 25 successive pulses. With increasing internal cell resistance, the voltage present across the cell at the time $t_m$ increases. For example, this voltage increases from its initial value $V_A$ through a value $V_B$ to a final value of $V_C$. The dynamic scattering voltage threshold of the circuit is some value between $V_A$ and $V_C$ and, as soon as it is reached, the crystal begins to exhibit the dynamic scattering effect in the manner illustrated in the second waveform of FIG. 6.

Figure 8:
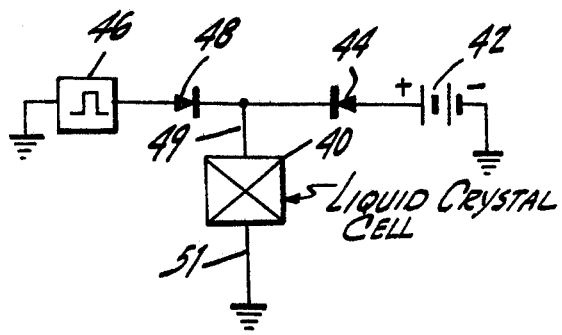
FIGURES 8 and 9 are schematic showings of circuits according to the present invention.
Figure 9:
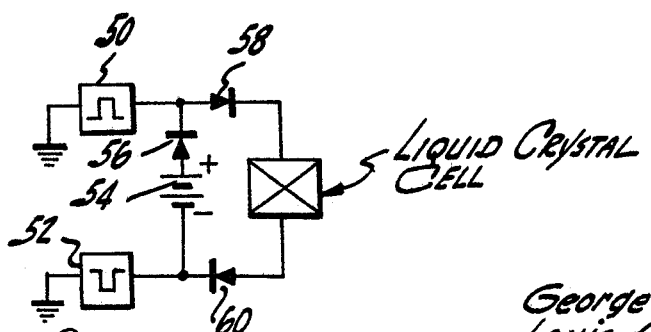

The solution of the present invention to the problem above is shown in FIGS. 8 and 9. The liquid crystal cell 40 is biased by a bias source shown schematically at 42 to a level which may be substantially lower than its threshold level. In practice, the bias which is found to give good performance may be of the order of 25% of the dynamic scattering voltage threshold. The diode 44 may be employed between the bias source 42 and the liquid crystal cell to prevent shorting the write voltage source 46 to ground.

In the operation of the circuit of FIG. 8, the bias applied to the liquid crystal cell sweeps any current carriers which may be present in the liquid crystal to the relatively positively and negatively charged conductors (12 and 10 of FIG. 2 and the conductors within cell 40 connected to lead 49 and 51 in FIG. 8) in contact with the liquid crystal. Thus, the liquid crystal cell exhibits a high internal resistance at the time the source 46 applies an excitation pulse thereto and essentially immediately "lights up" at relatively high intensity.

The actual scattering characteristic is shown in the third waveform of FIG. 6. The dramatic improvement is believed to be self-evident from this figure. As an added bonus, it is found, in practice, that for a given amplitude of the write or excitation pulse, the liquid crystal cell exhibits a substantially larger scattering effect with the circuit of FIG. 8 (or the circuit of FIG. 9) than does the liquid crystal cell of the known circuit of FIG. 3. The maximum scattering effect achieved in the FIG. 3 circuit is shown at $S_{M_1}$ in FIG. 6 and the maximum scattering effect of the present circuits is shown at $S_{M_2}$ in FIG. 6. When normalized to the zero scattering axis, $S_{M_2}$ is still found to be substantially greater than $S_{M_1}$.

Another form of the circuit of the invention is shown in FIG. 9. Here, the liquid crystal is excited by the concurrent removal of the back bias on diode 58 by the write source 50 and a negative pulse by the write source 52. (Note that the source 50, during the periods between positive-going pulses, may produce an output which is negative relative to ground and source 52, during the periods between negative pulses may produce an output which is at ground.) The bias source, illustrated by battery 54, is connected to the liquid crystal cell through both its own diode 56 and through the diodes 58 and 60. As in the previous circuit, the bias voltage may be 25% or so of the threshold voltage for dynamic scattering of the liquid crystal cell.

While not illustrated, it is to be understood that the liquid crystal cell circuits of the present arrangement may be arranged in a matrix in a manner well understood in the art as, for example, is illustrated in the concurrently filed application.

What is claimed is:

1. A method for reducing the time required for a nematic liquid crystal cell, to which repetitive electrical pulses are to be applied, to scatter light to an extent which is a function of the amplitude of said pulses comprising the step of substantially increasing the internal resistance of the cell and the additional step, during the time the cell is in its high resistance condition, of applying thereto said repetitive electrical pulses.

2. A method for reducing the time required for a nematic liquid crystal cell, to which repetitive electrical pulses are to be applied, to scatter light to an extent which is a function of the amplitude of said pulses comprising the step of substantially reducing the number of free current carriers present in the liquid crystal and the additional step, during the time the number of free current carriers is substantially reduced, of applying to said cell said repetitive electrical pulses.

3. The method of claim 2 wherein the first step set forth comprises applying a bias voltage to said cell at a level substantially lower than the voltage threshold for dynamic scattering of the cell.

4. The method of claim 3 wherein said applied bias is a continuous direct voltage bias.

5. In combination:
a nematic liquid crystal cell of the type which exhibits the dynamic scattering effect;
means for applying excitation pulses which exceed the voltage threshold for dynamic scattering of the cell, to said cell; and
means for applying a bias to said cell in the same polarity as the excitation pulses but at a voltage level substantially lower than that of the voltage threshold for dynamic scattering of the cell.

6. In the combination set forth in claim 5, said last-named means applying a continuous, direct voltage bias to said cell.

References Cited

UNITED STATES PATENTS 3,364,433    1/1968    Freund et al.
3,410,999    11/1968    Fergason et al.

RONALD L. WIBERT, Primary Examiner

PAUL K. GODWIN, JR., Assistant Examiner

U.S. Cl. X.R.

315—176